United States Patent
Crucs

(10) Patent No.: US 8,050,001 B2
(45) Date of Patent: Nov. 1, 2011

(54) TIMED ELECTRICAL OUTLET AND A METHOD OF OPERATION THEREOF

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 88 days.

(21) Appl. No.: 12/187,579

(22) Filed: Aug. 7, 2008

(65) Prior Publication Data

US 2010/0033997 A1     Feb. 11, 2010

(51) Int. Cl.
*H02H 3/00* (2006.01)
*H02M 7/04* (2006.01)

(52) U.S. Cl. ............................... 361/42; 363/143

(58) Field of Classification Search .......... 363/143–147; 307/46, 66, 71, 82; 361/42–50, 79, 86, 87, 361/94

See application file for complete search history.

(56) References Cited

U.S. PATENT DOCUMENTS

| | | | |
|---|---|---|---|
| 4,588,901 A * | 5/1986 | Maclay et al. | 307/141 |
| 4,782,420 A * | 11/1988 | Holdgaard-Jensen | 361/58 |
| 5,528,131 A | 6/1996 | Marty et al. | |
| 5,742,466 A * | 4/1998 | Kram | 361/118 |
| 5,801,635 A * | 9/1998 | Price | 340/656 |
| 5,848,135 A * | 12/1998 | Elghanayan et al. | 379/100.01 |
| 6,087,741 A * | 7/2000 | Båberg | 307/139 |
| 6,160,728 A * | 12/2000 | Peterson et al. | 363/146 |
| 6,552,888 B2 * | 4/2003 | Weinberger | 361/57 |
| 6,590,481 B2 | 7/2003 | Turner et al. | |
| 6,811,444 B2 * | 11/2004 | Geyer | 439/650 |
| 6,991,495 B1 * | 1/2006 | Aromin | 439/620.08 |
| 7,230,299 B2 | 6/2007 | Robb et al. | |
| 7,230,470 B1 | 6/2007 | You et al. | |
| 7,505,237 B2 * | 3/2009 | Baxter | 361/42 |
| 7,821,761 B2 * | 10/2010 | Chen | 361/160 |
| 2004/0160129 A1 * | 8/2004 | Dahlberg | 307/116 |
| 2007/0038334 A1 | 2/2007 | Chou et al. | |
| 2007/0086126 A1 * | 4/2007 | Baxter | 361/42 |
| 2008/0164768 A1 | 7/2008 | Litwack | |

* cited by examiner

*Primary Examiner* — Adolf Berhane
*Assistant Examiner* — Emily Pham
(74) *Attorney, Agent, or Firm* — Hahn Loeser & Parks LLP

(57) ABSTRACT

A timed electrical outlet (or pluggable apparatus) and a method of operation thereof. The electrical outlet (or pluggable apparatus) includes a current sensor, a counter, and an electrical switch. When an electrical load is plugged into the electrical outlet (or pluggable apparatus), the current sensor senses the flow of current and triggers the counter to start counting. When the counter is finished counting, the counter triggers the electrical switch, opening the current path within the electrical outlet (or pluggable apparatus) such that electrical current no longer flows to the electrical load.

17 Claims, 6 Drawing Sheets

TIMED ELECTRICAL OUTLET AND A METHOD OF OPERATION THEREOF

TECHNICAL FIELD

Certain embodiments of the present invention relate to electrical outlets. More particularly, certain embodiments relate to electrical outlets or pluggable apparatus that disable themselves as a safety feature.

BACKGROUND

Standard electrical outlets may be found in homes, office buildings, and factories, for example. Such electrical outlets provide readily available electricity to those who need it, for example, for lamps, appliances, televisions, audio equipment, curling irons, etc. To provide electricity to an electrical outlet, electrical wiring is routed from an electrical panel to the electrical outlet, with possible intermediate routings to other electrical outlets or lights along the way. The electrical wiring includes a hot wire (typically a black wire or a blue wire) that brings electrical power to the electrical outlet from the electrical panel, and a neutral wire (typically a white wire) that returns power from the electrical outlet to the electrical panel. A third wire is often provided (typically a green wire) that serves as a grounding wire.

When an electrical load (e.g., a lamp) is plugged into an electrical outlet, a closed circuit is completed between the hot wire and the neutral wire and electrical current flows between the electrical panel and the electrical outlet through the electrical load. In the United States, such electrical power is provided as an alternating current (AC) at about 120 Volts (i.e., 120 VAC) at a frequency of 60 Hz.

External timers exist that may be plugged into an electrical outlet. Such external timers are often used to turn on a lamp at a particular time of day (e.g., 6:00 p.m.), and then turn off the lamp at another particular time of day (e.g., 12:00 midnight). Such external timers typically use power provided by the electrical outlet to operate and are always running (i.e., keeping time) as long as they are plugged in to the electrical outlet.

Various safety features have been designed into electrical outlets such as, for example, ground-fault circuit interrupters (GFCI) which serve to protect people from electrical shock. However, sometimes a person may plug an electrical load (e.g., a hair curling iron) into an electrical outlet and end up forgetting about it, leaving the electrical load plugged in and drawing current, due to becoming distracted or because they may be suffering from short term memory loss, for example. In such circumstances, depending on the type of electrical load and any safety features it may or may not have, the electrical load could become a fire hazard or some other type of safety hazard.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

An embodiment of the present invention comprises an electrical outlet including a hot electrical terminal and a neutral electrical terminal. The electrical outlet further includes a current sensor adapted to detect an electrical current flowing between the hot electrical terminal and the neutral electrical terminal in response to a current drawing load being plugged into the electrical outlet. The electrical outlet also includes a counter operatively connected to the current sensor to count over a preset time interval in response to the current sensor detecting the flowing electrical current. The electrical outlet further includes an electrical switch operatively connected to the counter to switch from a closed position to an open position, thereby stopping the flowing electrical current, in response to the counter finishing counting over the preset time interval.

The electrical outlet may further include a power regulator operatively connected between the hot electrical terminal and the neutral electrical terminal to convert AC electrical power to direct current (DC) electrical power. The power regulator is further operatively connected to at least one of the current sensor, the counter, and the electrical switch to provide the DC electrical power thereto. In addition, or as an alternative, the electrical outlet may further include a DC battery operatively connected to at least one of the current sensor, the counter, and the electrical switch to provide DC electrical power thereto. The electrical outlet may also include a reset button operatively connected to the electrical switch to facilitate closing of the electrical switch.

Another embodiment of the present invention comprises an electrical outlet for providing AC electrical power to an electrical load, the electrical outlet having a hot electrical portion and a neutral electrical portion and being capable of having an electrical load plugged thereinbetween. An improvement to the electrical outlet comprises a safety apparatus. The safety apparatus includes a current sensor adapted to detect an electrical current flowing between the hot electrical portion and the neutral electrical portion in response to a current drawing load being plugged into the electrical outlet. The safety apparatus further includes a counter operatively connected to the current sensor to count over a preset time interval in response to the current sensor detecting the flowing electrical current. The safety apparatus also includes an electrical switch operatively connected to the counter to switch from a closed position to an open position, thereby stopping the flowing electrical current, in response to the counter finishing counting over the preset time interval.

The safety apparatus may further include a power regulator operatively connected between the hot electrical portion and the neutral electrical portion to convert AC electrical power to DC electrical power. The power regulator is further operatively connected to at least one of the current sensor, the counter, and the electrical switch to provide the DC electrical power thereto. In addition or as an alternative, the safety apparatus may include a DC battery operatively connected to at least one of the current sensor, the counter, and the electrical switch to provide DC electrical power thereto. The safety apparatus may further include a reset button operatively connected to the electrical switch to facilitate closing of the electrical switch.

A further embodiment of the present invention comprises a method of electrically disconnecting an electrical outlet from an external electrical load. The method includes sensing an electrical load plugged into the electrical outlet, counting over a preset time interval in response to the sensing, and opening a conductive path within the electrical outlet in response to reaching an end of the preset time interval, thereby stopping a flow of electrical current from the electrical outlet to the electrical load. The method may further include converting AC electrical power to DC electrical power within the electrical outlet and providing the DC electrical power to circuitry within the electrical outlet. The method may also include closing the conductive path within the electrical outlet by manually activating a reset control on an external portion of the electrical outlet.

Another embodiment of the present invention comprises an electrical outlet. The electrical outlet includes means for sensing an electrical load plugged into the electrical outlet. The electrical outlet further includes means for counting over a preset time interval in response to the sensing. The electrical outlet also includes means for opening a conductive path within the electrical outlet in response to reaching an end of the preset time interval, thereby stopping a flow of electrical current from the electrical outlet to the electrical load.

The electrical outlet may also include means for converting AC electrical power to DC electrical power within the electrical outlet, and means for providing the DC electrical power to at least one of the means for sensing, the means for counting, and the means for opening. The electrical outlet may also includes means for providing DC electrical power within the electrical outlet to at least one of the means for sensing, the means for counting, and the means for opening, independent of a means for converting AC electrical power to DC electrical power. The electrical outlet may further include means for closing the conductive path within the electrical outlet via external manual activation. The electrical outlet may further include means for indicating to a user when the conductive path is open within the electrical outlet. The electrical outlet may also include means for selecting or adjusting the preset time interval.

A further embodiment of the present invention comprises an apparatus capable of being plugged into a standard electrical outlet. The apparatus includes means for sensing an electrical load plugged into the apparatus when the apparatus is plugged into an electrical outlet. The apparatus also includes means for counting over a preset time interval in response to the sensing. The apparatus further includes means for opening a conductive path within the apparatus in response to reaching an end of the preset time interval, thereby stopping a flow of electrical current from the electrical outlet to the electrical load.

The apparatus may further include means for converting AC electrical power to DC electrical power within the apparatus and means for providing the DC electrical power to at least one of the means for sensing, the means for counting, and the means for opening. The apparatus may also include means for providing DC electrical power within the apparatus to at least one of the means for sensing, the means for counting, and the means for opening, independent of the AC electrical power.

The apparatus may further include means for closing the conductive path within the apparatus via external manual activation. The apparatus may also include means for indicating to a user when the conductive path is open within the apparatus. The apparatus may further include means for selecting the preset time interval.

These and other novel features of the subject matter of the present application, as well as details of illustrated embodiments thereof, will be more fully understood from the following description and drawings.

DETAILED DESCRIPTION

Figure 1:
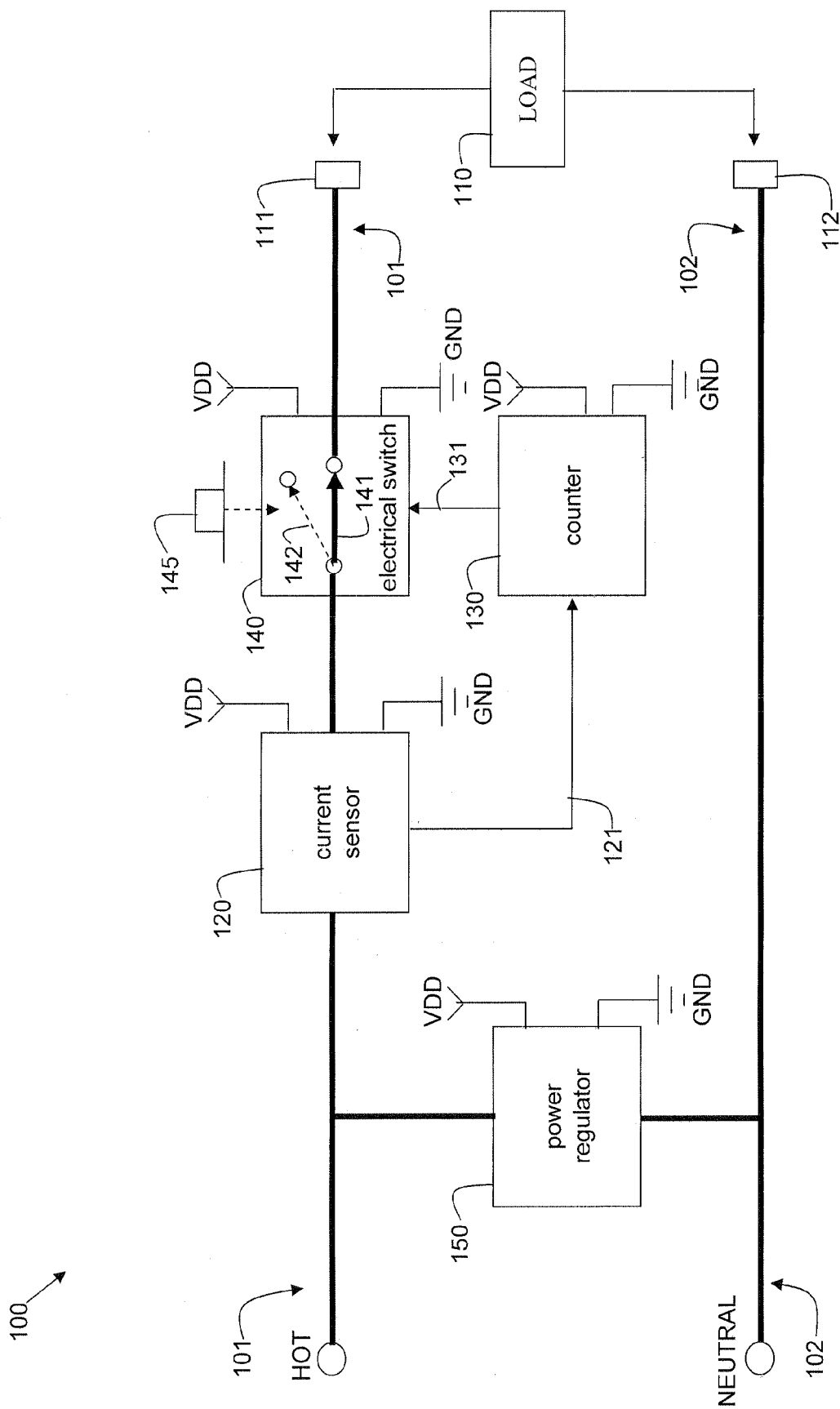
FIG. 1 illustrates a schematic block diagram of a first exemplary embodiment of an electrical outlet.

FIG. 1 illustrates a schematic block diagram of a first exemplary embodiment of an electrical outlet 100. The electrical outlet 100 includes a "hot" portion or side 101 and a "neutral" portion or side 102. Electrical power is brought in to the hot side 101 via a hot wire (typically a black wire or a blue wire) from, for example, an electrical panel. The electrical power is brought out of the neutral side 102 of the electrical outlet 100 via a neutral wire (typically a white wire) that returns power from the electrical outlet 100 to, for example, the electrical panel. A third wire is often provided (typically a green wire) that serves as a grounding wire and may be connected to a grounding terminal of the electrical outlet 100, if such a grounding terminal (not shown) is provided.

An electrical load 110 may be plugged into prongs 111 and 112 of the electrical outlet 100 in order to provide electrical power to the electrical load 110. The electrical load 110 is not part of the electrical outlet 100, however. Prong 111 is connected to the hot side 101 and prong 112 is connected to the neutral side 102. When an electrical load 110 is plugged into the prongs 111 and 112 of the electrical outlet 100, forming a closed circuit path, electric current flows between the hot side 101 and the neutral side 102 through the electrical load 110. For example, the electrical load may be a hair dryer, a hair curling iron, an electrical appliance, or some other type of electrical load.

The electrical outlet 100 also includes a current sensor 120, a counter 130, and an electrical switch 140. As shown in FIG. 1, the current sensor 120 is in the current path on the hot side 101 of the electrical outlet 100. The current sensor 120 senses when electric current flows through the electric outlet 100 (because of the connected load 110) and outputs an enabling signal 121 to the counter 130, causing the counter 130 to start counting over a preset time interval. When the counter 130 is finished counting over the preset time interval, the counter outputs a triggering or tripping signal 131 to the electrical switch 140 which is also in the current path on the hot side 101 of the electrical outlet 100. During normal operation, the electrical switch 140 is in a closed (i.e., conducting) position 141, allowing electric current to flow through the electrical outlet 100 and the load 110 until the electrical switch 140 is tripped by the trigger signal 131. When tripped by the trigger signal 131, the electrical switch 140 opens to the opened (non-conducting) position 142, preventing current flow through the electrical outlet 100 and, therefore, through the electrical load 110.

In accordance with an embodiment of the present invention, the counter 130 may be a digital counter implemented on an integrated circuit chip which is well known in the art. Other types of counters or timing circuits may be possible as well. The current sensor 120 may be, for example, a current transformer based device, a Hall effect based device, a magnetoresistive effect based device, or a resistor based device which are all well known in the art and capable of sensing AC current. Other types of current sensors may be possible as well. The electrical switch 140 may be a triggerable or controllable single pole single throw (SPST) power switch of any of various types which are well known in the art. In accordance with an embodiment of the present invention, the electrical switch 140 is manually resettable from the open position 142 to the closed position 141 via a reset button 145 of, for example, the push-button type which are well known in the art. Other types of reset mechanisms are possible as well.

The current sensor 120, the counter 130, and the electrical switch 140 may each be discrete devices and may all be mounted on a printed circuit board (PCB), for example, within the electrical outlet 100. As an alternative, any or all of the devices 120, 130, and 140 may be integrated into a single device. For example, the current sensor 120 and the counter 130 may each be integrated into a single integrated circuit device which may be mounted on a PCB.

Typically, the devices 120, 130, and 140 will require electrical power to operate. For example, some or all of the devices 120, 130, and 140 may require DC electrical power VDD of, for example, 5 VDC to operate. As a result, the electrical outlet 100 may include a power regulator 150 operatively connected between the hot side 101 and the neutral side 102 of the electrical outlet 100 and capable of converting AC electrical power to DC electrical power VDD with respect to a DC ground potential GND, as shown in FIG. 1. The DC electrical power VDD and DC ground potential GND provided by the power regulator 150 may be routed to the various devices 120, 130, and 140 via, for example, power traces on a PCB or via discrete wires. In certain embodiments, two or more levels of DC voltage may be required. In such embodiments, the power regulator 150 may provide two or more levels of DC electrical power (e.g., 5 VDC and 12 VDC).

Figure 2:
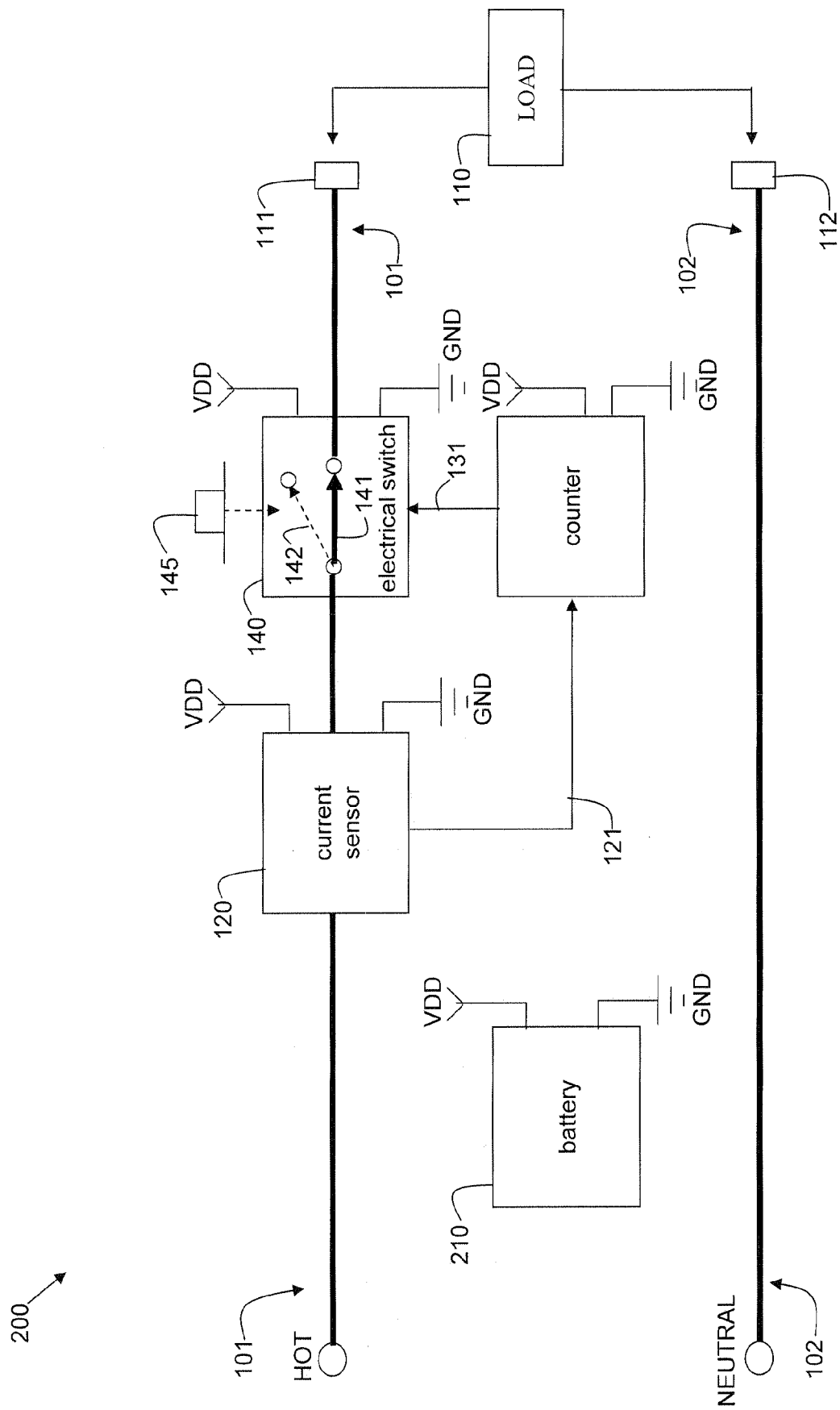
FIG. 2 illustrates a schematic block diagram of a second exemplary embodiment of an electrical outlet.

FIG. 2 illustrates a schematic block diagram of a second exemplary embodiment of an electrical outlet 200. The electrical outlet 200 is identical to the electrical outlet 100 of FIG. 1 except that, instead of a power regulator 150, a battery 210 is provided which supplies DC electrical power VDD with respect to a DC ground potential GND. Again, the DC electrical power may be used by the current sensor 120, the counter 130, and/or the electrical switch 140. In accordance with an alternative embodiment of the present invention, an electrical outlet may include both a power regulator 150 and at least one battery 210. The power regulator 150 may power one subset of the internal devices of the electrical outlet and the battery 210 may power a second subset of the internal devices of the electrical outlet. For example, the battery 210 may power the current sensor 120 and the counter 130, while the power regulator 150 may power the electrical switch 140.

Figure 3:
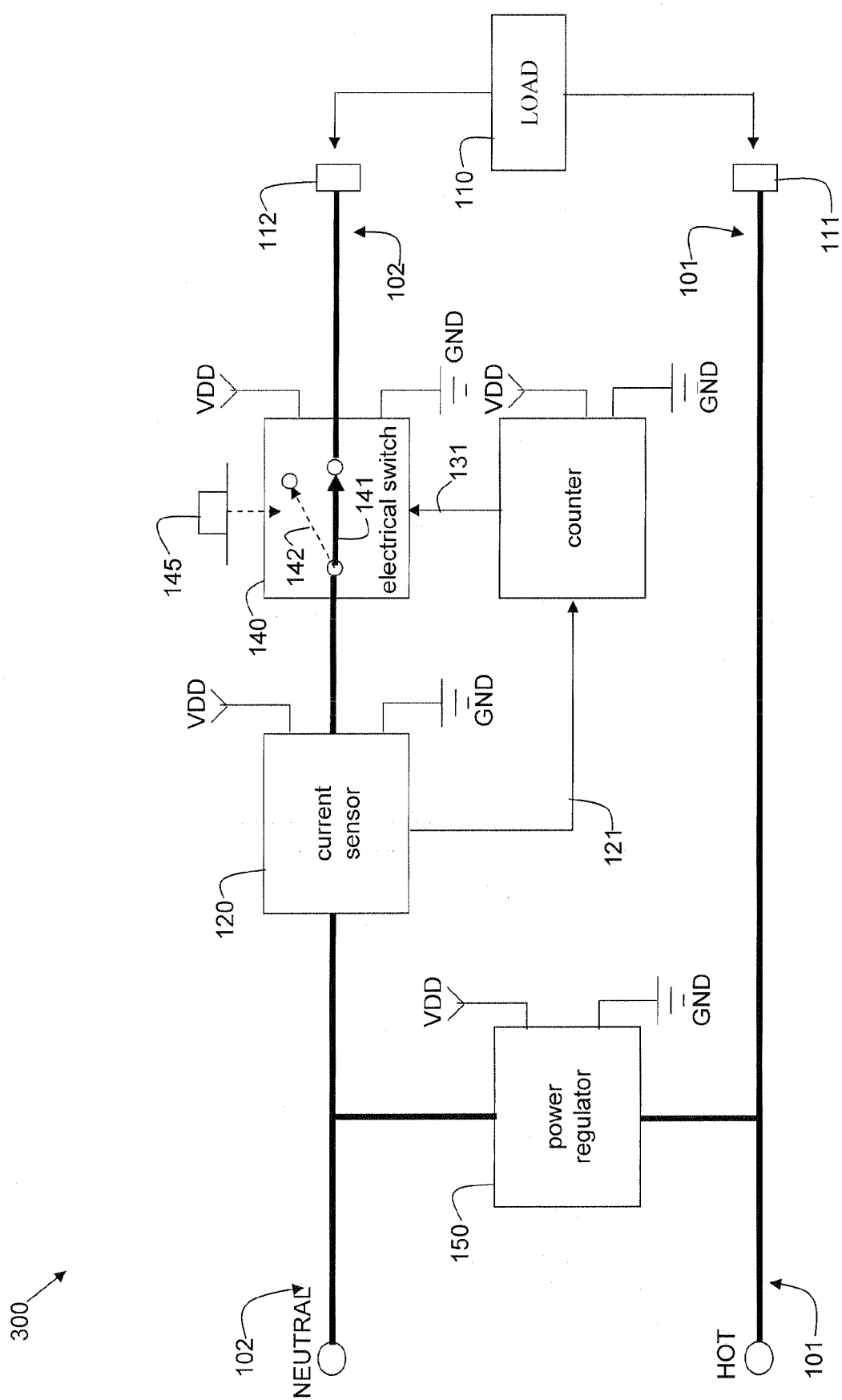
FIG. 3 illustrates a schematic block diagram of a third exemplary embodiment of an electrical outlet.

FIG. 3 illustrates a schematic block diagram of a third exemplary embodiment of an electrical outlet 300. The electrical outlet 300 is identical to the electrical outlet 100 of FIG. 1 except that the hot side 101 and the neutral side 102 are reversed. That is, the current sensor 120 and the electrical switch 140 are in the neutral side path of the electrical outlet 300 instead of the hot side path. Such a configuration 300 may work equally as well as the configuration of FIG. 1.

Figure 4:
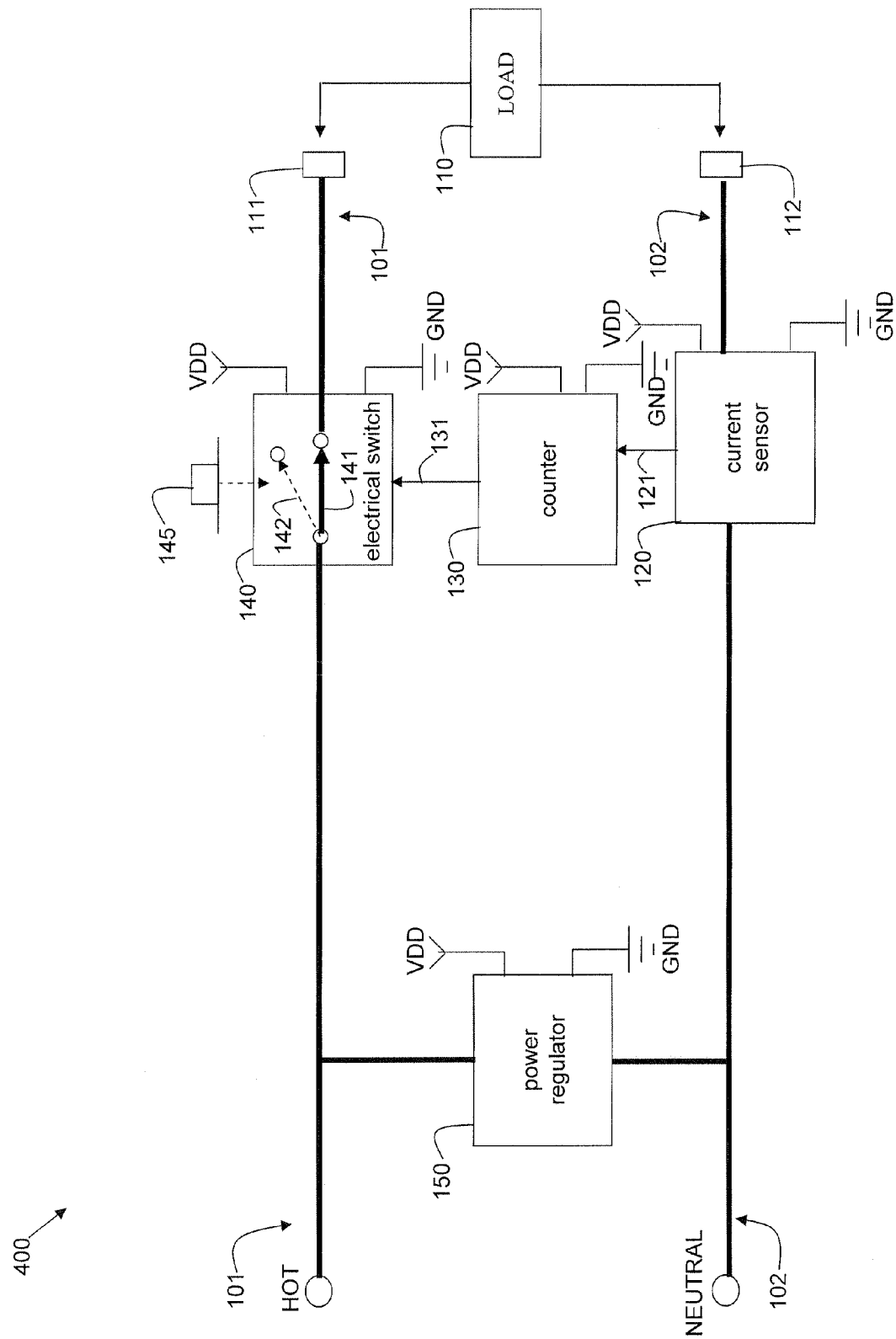
FIG. 4 illustrates a schematic block diagram of a fourth exemplary embodiment of an electrical outlet.

Similarly, FIG. 4 illustrates a schematic block diagram of a fourth exemplary embodiment of an electrical outlet 400. In this embodiment, the electrical switch 140 is on the hot side 101 of the electrical outlet 400, however, the current sensor 120 is on the neutral side 102 of the electrical outlet 400. Again, such a configuration 400 may work equally as well as the configuration of FIG. 1 or the configuration of FIG. 3. Other electrical outlet configurations having a current sensor 120, a counter 130, and an electrical switch 140 may be possible as well, in accordance with various other embodiments of the present invention.

Figure 5:
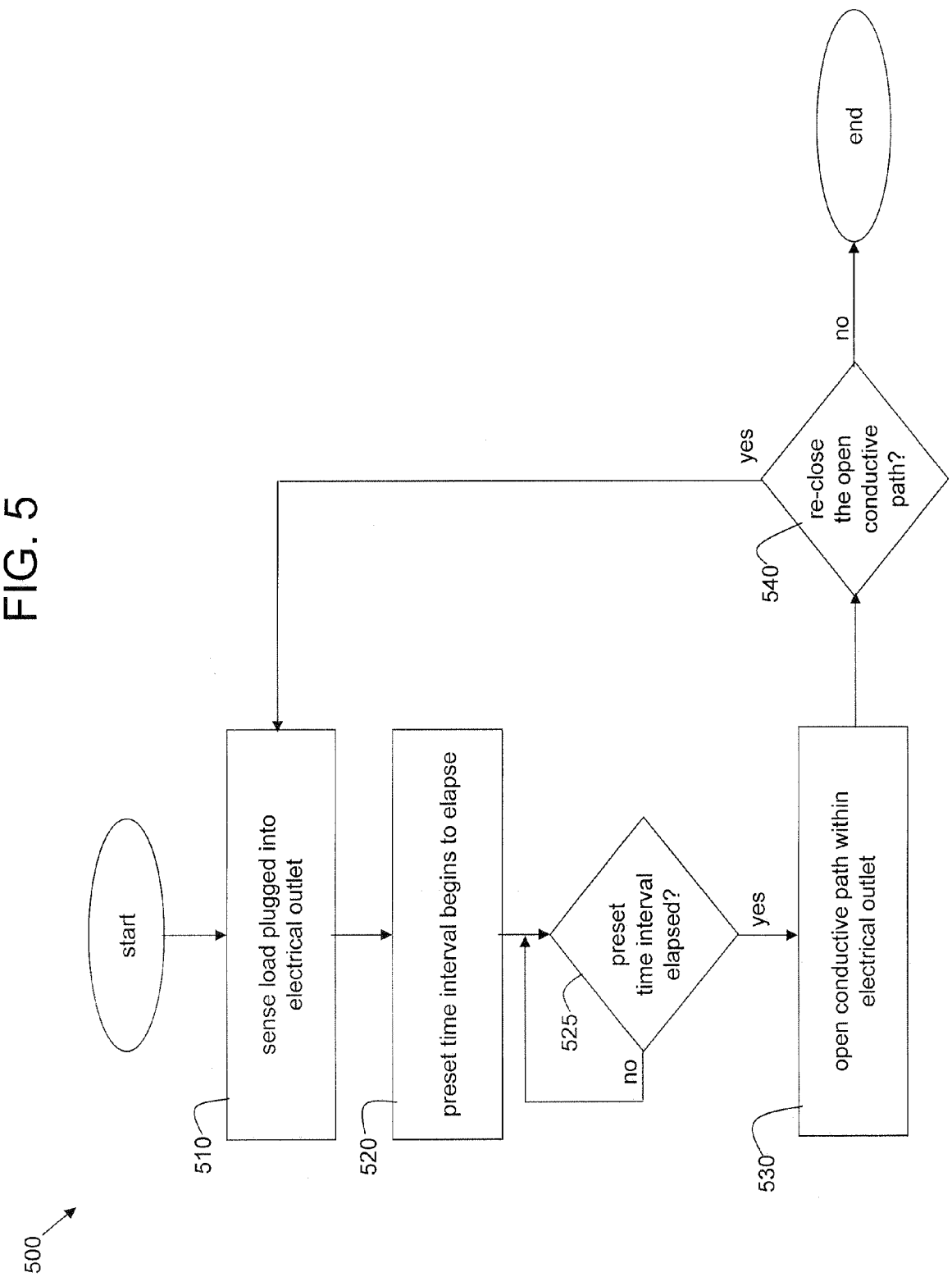
FIG. 5 illustrates a flowchart of an exemplary embodiment of a method of electrically disconnecting an electrical outlet from an external electrical load.

FIG. 5 illustrates a flowchart of an exemplary embodiment of a method 500 of electrically disconnecting an electrical outlet from an external electrical load. In step 510, an electrical load that is plugged in to an electrical outlet is sensed. In step 520, a preset time interval begins to elapse (e.g., a counter may be enabled) in response to the plugged in electrical load being sensed. If the preset time interval has elapsed (e.g., see step 525) then, in step 530, a conductive path within the electrical outlet is opened in response to reaching the end of the preset time interval, thereby stopping the flow of electrical current from the electrical outlet to the electrical load. In step 540, the method 500 may further include re-closing the open conductive path within the electrical outlet by manually activating a reset control (e.g., a push-type reset button) on an external portion of the electrical outlet. If the electrical load is still plugged into the electrical outlet, the electrical outlet will again, in step 510, sense the load and the process will start again.

The method 500 may further include converting AC electrical power to DC electrical power within the electrical outlet and providing the DC electrical power to circuitry within the electrical outlet. The method 500 may also include providing DC electrical power to circuitry within the electrical outlet independent of any AC electrical power (e.g., via a battery).

As an example, referring to FIG. 1, a user may plug a curling iron (as an electrical load 110) into the prongs 111 and 112 of the electrical outlet 100 in anticipation of using the curling iron after it heats up, but then forgets about it. With one of today's standard outlets (and assuming the curling iron does not have an automatic shut-off feature), the curling iron would continue to draw current from the electrical outlet and possibly continue to heat up. However, with the electrical outlet 100 of FIG. 1, after a preset time interval (starting from the time the curling iron is plugged in and begins drawing current), the electrical switch 140 will open and prevent electrical current from flowing to the curling iron. As a practical matter, the preset time interval may be, for example, ten minutes. The user may come back later (e.g., after the ten minutes) and press the reset button 145 on the electrical outlet 100 to close the electrical switch 140, allowing the curling iron to begin heating up once again. As a result, the current sensor 120, the counter 130, and the electrical switch 140 serve as a safety apparatus within the electrical outlet 100. The reset button 145 or some other visible portion of the electrical outlet 100 may be fitted with a light-emitting diode (LED), or some other type of indicator. The LED is turned on (emits light) when the electrical switch 140 is in the open position 142, indicating to the user that the electrical outlet 100 is to be reset.

As a further example, referring to FIG. 1, a user may plug a waffle iron (as an electrical load 110) into the prongs 111 and 112 of the electrical outlet 100 in anticipation of making waffles. The user may leave the kitchen where the waffle iron is plugged in and the waffle iron may accidentally drop closed, causing the waffle iron to draw current and heat up. With one of today's standard outlets (and assuming the waffle iron does not have an automatic shut-off feature), the waffle iron would continue to draw current from the electrical outlet and possibly continue to heat up. However, with the electrical outlet 100 of FIG. 1, after a preset time interval (starting from the time the waffle iron closes and begins drawing current), the electrical switch 140 will open and prevent electrical current from flowing to the waffle iron. As a practical matter, the preset time interval may be, for example, one minute. The user may come back later (e.g., after the one minute) and press the reset button 145 on the electrical outlet 100 to close the electrical switch 140, allowing the waffle iron to begin heating up once again. Again, the current sensor 120, the counter 130, and the electrical switch 140 serve as a safety apparatus within the electrical outlet 100.

Such electrical outlets, as described herein in accordance with various embodiments of the present invention, may be judicially placed within a household. For example, bathrooms and kitchens may be places within a household where it makes the most sense to install such electrical outlets since these rooms are where electrical loads such as curling irons, blow dryers, waffle irons, and other appliances are most often used. Furthermore, college dorm rooms and nursing homes may be places where such electrical outlets would be of great benefit. Also, within a factory, such electrical outlets may be very practical, allowing various types of power tools or equipment to time out and turn off after a certain preset period of time.

In accordance with an alternative embodiment of the present invention, the preset period of time may be selectable or adjustable. For example, an electrical outlet may be configured with DIP (dual inline package) switches or some other type of selector or user interface (e.g., up/down buttons) operatively connected to the counter 130, allowing the preset time interval to be selected. Such selectability would allow the electrical outlet to be more flexible. For example, an electrician may install an electrical outlet in a bathroom and set the time interval to seven minutes. The electrician may install another electrical outlet of the same type in a kitchen and set the time interval to two minutes.

Figure 6:
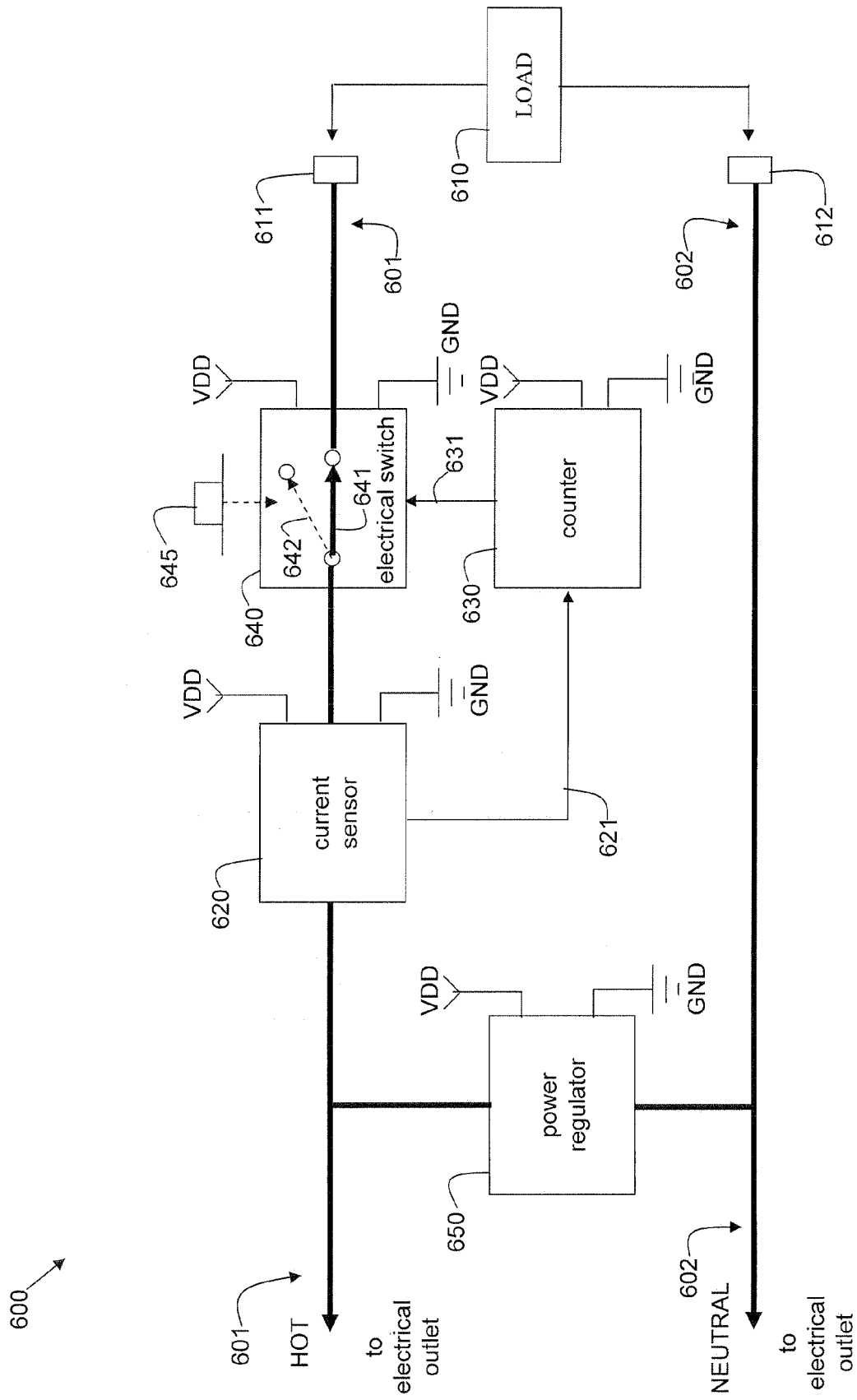
FIG. 6 illustrates a schematic block diagram of a device that may be plugged into a standard electrical outlet to provide the functionality of electrically disconnecting an external electrical load from the standard electrical outlet.

Another alternative embodiment of the present invention provides the functionality of a current sensor, a counter, and an electrical switch as described herein, but in a device (pluggable apparatus) that is separate from an electrical outlet and which may be plugged into a standard electrical outlet. FIG. 6 illustrates a schematic block diagram of a device 600 (a pluggable apparatus) that may be plugged into a standard electrical outlet to provide the functionality of electrically disconnecting an external electrical load 610 from the standard electrical outlet. The device 600 is very similar to the device 100 of FIG. 1 except that the device 600 is not an electrical outlet as such that is mounted, for example, within a wall and is wired to an electrical panel. Instead, the device 600 is an external device that may be plugged into a standard electrical outlet and yet provide the same functionality as the electrical outlet 100 of FIG. 1.

The device 600 includes a "hot" portion or side 601 and a "neutral" portion or side 602. The hot side 601 plugs into a hot prong of an electrical outlet, and the neutral side 602 plugs into a neutral prong of an electrical outlet. A third portion may be provided that serves as a grounding portion and may be plugged into a grounding plug of an electrical outlet.

An electrical load 610 may be plugged into prongs 611 and 612 of the device 600 in order to provide electrical power to the electrical load 610. The electrical load 610 is not part of the electrical outlet or the device 600, however. Prong 611 is connected to the hot side 601 and prong 612 is connected to the neutral side 602. When an electrical load 610 is plugged into the prongs 611 and 612 of the device 600, forming a closed circuit path, electric current flows between the hot side 601 and the neutral side 602 through the electrical load 610. For example, the electrical load may be a hair dryer, a hair curling iron, an electrical appliance, or some other type of electrical load.

The device 600 also includes a current sensor 620, a counter 630, and an electrical switch 640. As shown in FIG. 6, the current sensor 620 is in the current path on the hot side 601 of the device 600. The current sensor 620 senses when electric current flows through the device 600 (because of the connected load 610) and outputs an enabling signal 621 to the counter 630, causing the counter 630 to start counting over a preset time interval. When the counter 630 is finished counting over the preset time interval, the counter outputs a triggering or tripping signal 631 to the electrical switch 640 which is also in the current path on the hot side 601 of the device 600. During normal operation, the electrical switch 640 is in a closed (i.e., conducting) position 641, allowing electric current to flow from the electrical outlet through the device 600 and the load 610 until the electrical switch 640 is tripped by the trigger signal 631. When tripped by the trigger signal 631, the electrical switch 640 opens to the opened (non-conducting) position 642, preventing current flow through the device 600 and, therefore, through the electrical load 610.

In accordance with an embodiment of the present invention, the counter 630 may be a digital counter implemented on an integrated circuit chip which is well known in the art. Other types of counters or timing circuits may be possible as well. The current sensor 620 may be, for example, a current transformer based device, a Hall effect based device, a magnetoresistive effect based device, or a resistor based device which are all well known in the art and capable of sensing AC current. Other types of current sensors may be possible as well. The electrical switch 640 may be a triggerable or controllable single pole single throw (SPST) power switch of any of various types which are well known in the art. In accordance with an embodiment of the present invention, the electrical switch 640 is manually resettable from the open position 642 to the closed position 641 via a reset button 645 of, for example, the push-button type which are well known in the art. Other types of reset mechanisms are possible as well.

The current sensor 620, the counter 630, and the electrical switch 640 may each be discrete devices and may all be mounted on a printed circuit board (PCB), for example, within the device 600. As an alternative, any or all of the elements 620, 630, and 640 may be integrated into a single device. For example, the current sensor 620 and the counter 630 may each be integrated into a single integrated circuit device which may be mounted on a PCB.

Typically, the elements 620, 630, and 640 will require electrical power to operate. For example, some or all of the elements 620, 630, and 640 may require DC electrical power VDD of, for example, 5 VDC to operate. As a result, the device 600 may include a power regulator 650 operatively connected between the hot side 601 and the neutral side 602 of the device 600 and capable of converting AC electrical power to DC electrical power VDD with respect to a DC ground potential GND, as shown in FIG. 6. The DC electrical power VDD and DC ground potential GND provided by the power regulator 650 may be routed to the various elements 620, 630, and 640 via, for example, power traces on a PCB or via discrete wires. In certain embodiments, two or more levels of DC voltage may be required. In such embodiments, the power regulator 650 may provide two or more levels of DC electrical power (e.g., 5 VDC and 12 VDC).

In accordance with various alternative embodiments of the present invention, the external device 600 may be configured and function similarly to the configurations shown in FIGS. 2-4 herein. Other configurations are possible as well.

In summary, an electrical outlet (or pluggable apparatus) and method for the electrical outlet (or pluggable apparatus) to disable itself are disclosed. The electrical outlet (or pluggable apparatus) includes a current sensor, a counter, and an electrical switch. When an electrical load is plugged into the electrical outlet (or pluggable apparatus), the current sensor senses the flow of current and triggers the counter to start counting. When the counter is finished counting, the counter triggers the electrical switch, opening the current path within the electrical outlet (or pluggable apparatus) such that electrical current no longer flows to the electrical load.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. An electrical outlet comprising:
    a hot electrical terminal;
    a neutral electrical terminal;
    a current sensor for detecting an alternating electrical current flowing between said hot electrical terminal and said neutral electrical terminal in response to a current drawing load being plugged into said electrical outlet;
    a counter operatively connected to said current sensor for counting over a preset time interval in response to being enabled when said current sensor first detects said flowing electrical current, and wherein said counter is not externally clocked by cycles of said alternating electrical current; and
    an electrical switch operatively connected to said counter for switching from a closed position to an open position, thereby stopping said flowing electrical current, in response to said counter finishing counting over said preset time interval.

2. The electrical outlet of claim 1 further comprising a power regulator operatively connected between said hot electrical terminal and said neutral electrical terminal to convert AC electrical power to DC electrical power.

3. The electrical outlet of claim 2 wherein said power regulator is further operatively connected to at least one of said current sensor, said counter, and said electrical switch to provide said DC electrical power thereto.

4. The electrical outlet of claim 1 further comprising a DC battery operatively connected to at least one of said current sensor, said counter, and said electrical switch to provide DC electrical power thereto.

5. The electrical outlet of claim 1 further comprising a reset button operatively connected to said electrical switch to facilitate closing of said electrical switch.

6. In an electrical outlet for providing AC electrical power to an electrical load, the electrical outlet having a hot electrical portion and a neutral electrical portion and being capable of having an electrical load plugged therein between, the improvement comprising a safety apparatus comprising:
    a current sensor for detecting an alternating electrical current flowing between said hot electrical portion and said neutral electrical portion in response to a current drawing load being plugged into said electrical outlet;
    a counter operatively connected to said current sensor for counting over a preset time interval in response to being enabled when said current sensor first detects said flowing electrical current, and wherein said counter is not externally clocked by cycles of said alternating electrical current; and
    an electrical switch operatively connected to said counter for switching from a closed position to an open position, thereby stopping said flowing electrical current, in response to said counter finishing counting over said preset time interval.

7. The safety apparatus of claim 6 further comprising a power regulator operatively connected between said hot electrical portion and said neutral electrical portion to convert AC electrical power to DC electrical power.

8. The safety apparatus of claim 7 wherein said power regulator is further operatively connected to at least one of said current sensor, said counter, and said electrical switch to provide said DC electrical power thereto.

9. The safety apparatus of claim 6 further comprising a DC battery operatively connected to at least one of said current sensor, said counter, and said electrical switch to provide DC electrical power thereto.

10. The safety apparatus of claim 6 further comprising a reset button operatively connected to said electrical switch to facilitate closing of said electrical switch.

11. An electrical outlet for providing alternating electrical current, said electrical outlet comprising:
    means for sensing an electrical load plugged into said electrical outlet;
    means for counting over a preset time interval in response to being enabled when said means for sensing first senses said electrical load, and wherein said means for counting is not externally clocked by cycles of said alternating electrical current; and
    means for opening a conductive path within said electrical outlet in response to reaching an end of said preset time interval, thereby stopping a flow of electrical current from said electrical outlet to said electrical load.

12. The electrical outlet of claim 11 further comprising means for converting AC electrical power to DC electrical power within said electrical outlet.

13. The electrical outlet of claim 12 further comprising means for providing said DC electrical power to at least one of said means for sensing, said means for counting, and said means for opening.

14. The electrical outlet of claim 11 further comprising means for providing DC electrical power within said electrical outlet to at least one of said means for sensing, said means for counting, and said means for opening.

15. The electrical output of claim 11 further comprising means for closing said conductive path within said electrical outlet via external manual activation.

16. The electrical outlet of claim 11 further comprising means for indicating to a user when said conductive path is open within said electrical outlet.

17. The electrical outlet of claim 11 further comprising means for selecting said preset time interval.

* * * * *